UNITED STATES PATENT OFFICE.

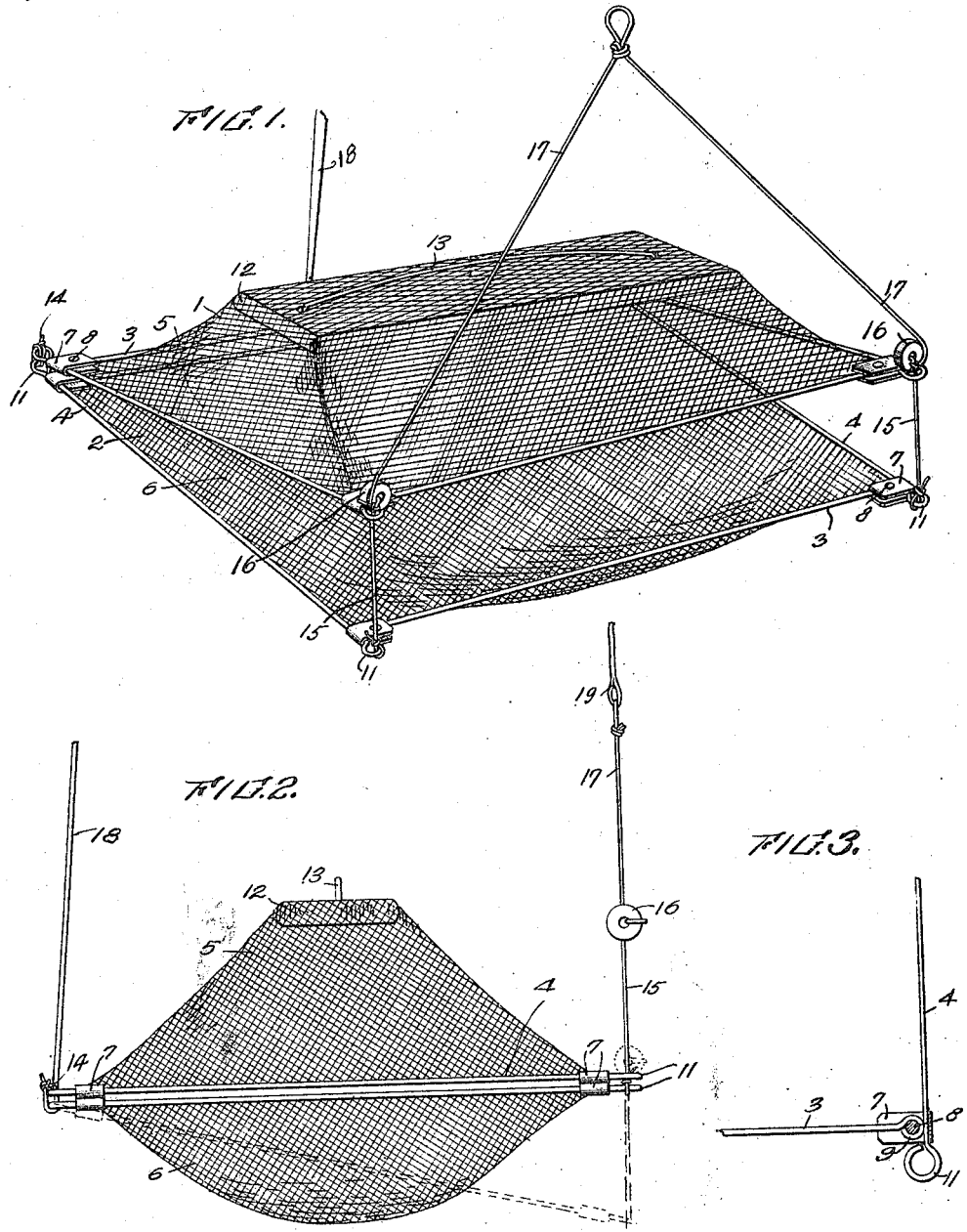

ROBERT M. FRANKLIN, OF GALVESTON, TEXAS.

TRAP-NET.

1,143,758.  Specification of Letters Patent.  Patented June 22, 1915.

Application filed April 17, 1914. Serial No. 832,639.

*To all whom it may concern:*

Be it known that I, ROBERT M. FRANKLIN, a citizen of the United States, residing at Galveston, in the county of Galveston and State of Texas, have invented certain new and useful Improvements in Trap-Nets; and I do hereby declare the following to be a full, clear, and exact description of the invention, such as will enable others skilled in the art to which it appertains to make and use the same.

This invention relates to improvements in net traps and an object of the invention is to provide a trap which can be held open at any depth or when resting upon bottom.

A further object of the invention is to provide a trap so constructed that the means for lifting the trap shall automatically close the trap.

A still further object of the invention is to provide a trap formed of substantially two members, one of which is buoyant and held upward while the other is acted upon by gravity and depends from the buoyant member, thereby keeping the members spaced from each other to admit game.

With these and other objects in view, the invention consists in the novel arrangement, construction, and combination of parts as will be hereinafter described and claimed.

In the accompanying drawings wherein similar reference characters designate corresponding members Figure 1 is a perspective view of this trap open; Fig. 2 is an end view of the trap closed, and Fig. 3 is a detail showing the corner construction of one of the frames.

The general aim of the present invention is to provide a trap formed of two or more sections which are movable with respect to each other as by having two frames loosely hinged together on one side, while the opposite sides are spaced by means of hangers which pass through eyes formed in the upper frame and are connected with the draft line. It will be desirable to have a float connected to the upper section for buoying the same while the lower section is heavy enough to be pulled down by gravity when in the water.

Referring to Figs. 1 and 2, it will be seen that the invention comprises two sections 1 and 2 which comprise frames upon which is mounted the netting 5 and 6 respectively. The side bars 3 of each of the frames have clips 7 secured thereto, as shown in detail in Fig. 3, each clip being held by means of a rivet 8 which passes through an eye 9 formed at the end of the bar. The end bars 4 pass through the bends of said clips and at their extremities are provided with eyes 11 constructed substantially as shown in Fig. 3, the eyes 11 extending beyond the bent portion of the clips 7 so as to prevent the side bars from being drawn through the clips. The frames of the sections 1 and 2 are substantially the same.

The section 1 is provided with a float 12 which is secured to the net of the upper section by passing a cord 13 through the net and securing the same in any suitable manner to the float. Preferably the float is not large enough to raise the entire upper net to the surface of the water, as the constant motion due to wave action would frighten the fish. The bottom section is made heavier than the top section.

By referring particularly to Fig. 2, it will be seen that the adjacent rear eyes 11 are connected by means of hinges, herein shown as loops 14 which may be made of any material, wire being shown in the drawing, although any approved form of hinge may be used for connecting the members which will permit of loose movement of one with respect to the other. These hinges are formed upon one side only of the trap.

Referring to Figs. 1 and 2, it will be seen that the side of the lower section 2 opposite the hinged side has each of the eyes 11 thereof connected loosely with the lower end of a hanger 15, which passes thence through the corresponding eye of the upper frame and is secured to a stop 16. The steps 16 are connected by means of a bail 17 which may be connected to any convenient form of draft line 19.

Secured to the hinged side of the trap is a lifting line 18 which may be used to lower the trap, the other side of this trap being supported by draft line 19, which is connected to bail 17. Lift line 18 may be colored differently from the draft line 19 or may be made smaller to distinguish from the draft cord 19.

When the device is lowered into the water and the float 12 is holding the trap sections separated, the trap will be open as shown in full lines in Fig. 1 and indicated in dotted lines in Fig. 2. As soon as an indication is given that game has been trapped, the draft line 19 will be pulled upwardly which will result in pulling the lower section of the trap upwardly toward the upper section until the trap is closed as shown in full lines in Fig. 2. It will be understood that when the trap is located on the bottom, which may be the case if the lower section 2 is sufficiently weighted, the float 12 will still operate to hold the section 2 raised and thereby allow game to enter. Of course, the operation of drawing the trap in will create sufficient pressure between the sections to keep the same closed. The hangers 15 may be wire, or if preferred they may be cord or rope for it is to be understood that when the trap is pulled upwardly through the water by the line 19 it will assume a position at right angles to that shown in Fig. 2 in which case, it will be desirable to have the hanger 15 flexible enough to line itself with the draft line and not be so rigid as to retain permanently the position it has with respect to the frame as shown in Fig. 2.

I claim:

1. A trap for fish and the like comprising sections loosely connected together, one of said sections being held downwardly by gravity, the other of said sections being buoyed upwardly to leave a space between the sections, and means for drawing the two sections together.

2. A trap for fish and the like, comprising a lower section heavier than water, a buoyant upper section loosely connected at one edge therewith, means for regulating the width of the opening between the other edges of the sections, and means for drawing the sections together in hoisting the trap out of the water.

3. A trap for fish and the like comprising a lower section held in lowered position by gravity, an upper section loosely hinged thereto, buoyant means secured to the upper section adapted to hold the upper section spaced from the lower section, and means for drawing the two sections together.

4. A trap for fish and the like comprising an upper frame provided with eyelets, floating means carried by the upper frame, a lower frame acted upon by gravity to remain in lowered position normally, and means extending through the eyelets and secured to the lower frame adapted to close the sections together when said means are spaced under tensional strain.

5. A trap for fish and the like comprising an upper frame, buoyant means carried by the frame, eyelets formed in the frame, a lower section hingedly connected thereto and held normally in lowered position by gravity, and means extending above the upper section through the eyelets and secured to the lower section, said sections adapted to be drawn together as the said means are pulled upwardly.

6. The herein described trap for fish and the like comprising upper and lower frames having eyes at their corners, hinges connecting the corresponding side bars at one side of the trap, netting in each frame, a buoyant element carried by the upper netting, the lower frame being heavier than water, a lifting line connected with the hinged sides of the frames, a draft line, and a bail connected with the lower end of the draft line and having its arms passing through the eyes of the upper frame at the other side of the trap and connected with the eyes of the lower frame.

7. The herein described trap for fish and the like comprising upper and lower frames having eyes at their corners, hinges connecting the corresponding side bars at one side of the trap, netting in each frame, a buoyant element carried by the upper netting, the lower frame and netting being heavier than water, a lifting line connected with the hinged sides of the frames, hangers connected with the eyes of the lower frame at the other side of the trap and passing through the eyes in the frame above, stops on these hangers above the last-named eyes, a draft line, and a bail connected at its bend with said line and at its extremities with the upper ends of the hangers, for the purpose set forth.

8. In a trap for fish and the like, two frames whereof each comprises a pair of side bars having eyes at their extremities, a pair of end bars passing said eyes and themselves having eyes at their extremities, a clip at each corner of the frame embracing the end bar adjacent its eye and lapping the eye of the side bar, the clip-rivet passing through the last-named eye, netting within the frame, and a buoyant element within the netting of the upper frame; combined with flexible connections between the eyes at the extremities of two corresponding corners of the frame, and cords passing through the eyes at the remaining corners of the upper frame and connected with the eyes at the two remaining corners of the lower frame, for the purpose set forth.

In testimony whereof I affix my signature in presence of two witnesses.

ROBERT M. FRANKLIN.

Witnesses:
C. HARPER ANDERSON,
C. H. JONES.